United States Patent [19]

Baker

[11] 4,246,608
[45] Jan. 20, 1981

[54] METHOD FOR MEASURING CROSSVIEW BETWEEN TWO CHANNELS IN A WIRED TELEVISION BROADCASTING SYSTEM

[75] Inventor: Henry L. Baker, Northwood, England

[73] Assignee: Communications Patents Limited, London, England

[21] Appl. No.: 911,093

[22] Filed: May 31, 1978

[30] Foreign Application Priority Data

Jun. 15, 1977 [GB] United Kingdom ............... 14636/77

[51] Int. Cl.³ .............................................. H04N 7/02
[52] U.S. Cl. ...................... 358/139; 358/86; 370/6; 375/10; 375/36
[58] Field of Search ............... 179/175.3 R, 175.31 R, 179/15 BF, 5 AN; 358/86, 139; 325/308, 60; 370/6; 458/67, 295; 375/10, 36, 58, 99, 102

[56] References Cited

U.S. PATENT DOCUMENTS

| | | | |
|---|---|---|---|
| 2,987,586 | 6/1961 | Berger | 179/175.3 |
| 3,278,676 | 10/1966 | Becker | 358/142 |
| 3,715,508 | 2/1973 | Blasbalg | 179/15 BC |
| 3,720,789 | 3/1973 | Clark | 179/15 BC |
| 3,735,266 | 5/1973 | Amitay | 325/60 |
| 3,891,805 | 6/1975 | Flanagan et al. | 179/15 BF |
| 4,061,881 | 12/1977 | Widl | 179/15 BF |

OTHER PUBLICATIONS

Measurement of Digital Crosstalk and Behavior of PCM Regenerators against Interference Electrical Comm., vol. 47, #4, 1972, pp. 293, 294.
Jacobsen—Cable, Crosstalk Limits on Low Capacity PCM Systems Elec. Comm., vol. 48, #1 and 2, pp. 98–107.
McKenzie—Automated Television Waveform Measurement by use of Digital Computer—Jour. Smpte.–vol. 83–pp. 702–707, 1974.

*Primary Examiner*—Robert L. Griffin
*Assistant Examiner*—Joseph A. Orsino, Jr.
*Attorney, Agent, or Firm*—Laurence R. Brown

[57] ABSTRACT

A method for measuring crossview between channels in a wired television broadcasting system is described in which a pseudo random binary pulse sequence signal is applied to a first channel, and the signal on a second channel is correlated with an identical sequence to provide an output representative of the crossview between the first and second channels. This enables crossview measurements to be easily made without interrupting television signals on the channels. The pseudo random binary pulse sequence signal may be applied directly to the first channel or modulated on a carrier for application to the first channel.

9 Claims, 5 Drawing Figures

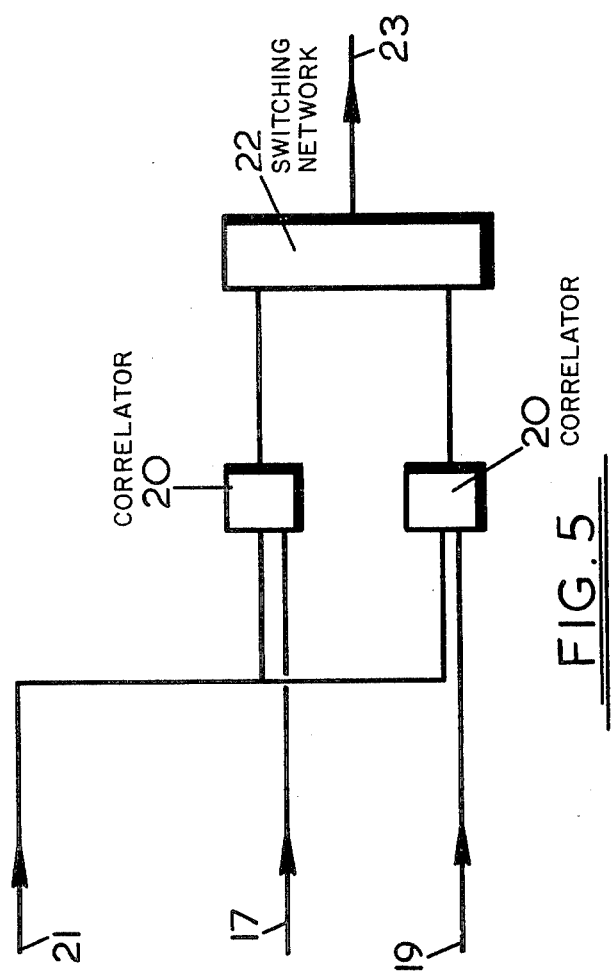

METHOD FOR MEASURING CROSSVIEW BETWEEN TWO CHANNELS IN A WIRED TELEVISION BROADCASTING SYSTEM

The present invention relates to a method for measuring crossview between channels in a wired television broadcasting system, which method makes use of pseudo random binary pulse sequence signals.

A pseudo random binary pulse sequence (hereinafter PRBPS) is a sequence of binary pulses which occur in an apparently random order. In a truly random sequence of say n pulses, all the possible sequences of pulses occur with equal probability. In contrast, a PRBPS does repeat itself, although in practice sequences several million bits long before repetition are used.

As is well known, it is a simple matter to generate a PRBPS using a continuously clocked shift register with outputs from its last and one or more intermediate stages fed back to the input via exclusive-OR gates. From an n-bit shift register, a PRBPS $2^n-1$ bits long known as a maximum or M sequence can be generated, and an M sequence is the one generally employed.

A PRBPS is the equivalent of "noise that repeats," and thus PRBPS techniques have been developed for audio system testing, computer security, cryptography and electronic music.

These techniques rely upon several distinctive properties of PRBPS. A first important property of PRBPS is reproducibility. This results from the fact that PRBPS are very easy to generate and they run through every possible combination of n bits. Thus they can be used for checking digital data transmission links. Suppose for example that it is desired to check a link for sending 8 bit words, as in "Teletext." A $2^8-1$ bit PRBPS generator is installed at the sending end and another at the receiving site. It is quite easy to synchronise them. If the received signal is compared with the locally generated signal by means of a digital comparator the number of incorrect bits received over a given period can be counted. Thus the error rate for the link can be established knowing that it has been tested using all 255 8-bit words. There is a 256th word—all zeros. To check this we send nothing and verify that nothing is received.

A second important property of PRBPS is the particular frequency spectrum obtainable. If each bit of a PRBPS has a duration T seconds then its spectrum has a null at 1/T Hertz and $2^n-1$ frequency components equally spaced between 0 and 1/T Hz for a $2^n-1$ bit sequence. Their amplitudes follow a sin x/x distribution, the more bits the greater the spectral density. The low frequency components are of nearly equal amplitude and by limiting the spectrum with a low pass filter a signal can be derived which is similar to band limited white noise. Thus a very simple PRBPS noise generator can be used for such things as measuring crosstalk and crossview, in wired broadcasting systems.

It is known that the autocorrelation function of a PRBPS is an impulse. If for example a PRBPS generator provides a $2^4-1$, i.e. 15 bit sequence, and the sequence is A.C. coupled, the '1' states can be regarded as having the value +1 and the '0' states can be regarded as having the value −1. One such sequence is thus:

+1+1+1+1−1−1−1+1−1−1+1+1−1+1−1

If this sequence is multiplied with an identical sequence not displaced in time, each product is +1, giving a sum for the products of 15 and a mean of 1.

If the above sequence is multiplied with an identical sequence displaced in time by one bit, the sum of the products is −1, giving a mean of −1/15. In fact, for any displacement of from one to fourteen bits, the mean of the sum of the totals is −1/15.

The above exercise illustrates the calculation of the autocorrelation function of the PRBPS. For a periodic function f(t), the autocorrelation function is defined mathematically as the mean of the product of the function f(t) multiplied by the time displacement of itself $f(t+\tau)$.

$$\text{i.e. } R(\tau) = \overline{f(t)f(t+\tau)}.$$

This is one of the most useful characteristics of a PRBPS which puts a powerful tool at our disposal, namely that its autocorrelation function is an impulse. This is in fact a Dirac function.

To carry out the autocorrelation process electrically a second PRBPS generator identical with the first is provided and its output is slowly displaced in time relative to that of the first generator. This can be done by slowly varying the phase or frequency of the clock or by regularly omitting one clock pulse. The two signals can then be multiplied in a mixer and the mean product can be obtained by using a low pass filter.

The output of the second PRBPS generator has to go through a time displacement equal to the duration of the $2^n-1$ bits of the PRBPS to produce one cycle of the autocorrelation function waveform. Thus the waveform can be produced as slowly as desired by reducing the scan rate, and the slower the scan rate the smaller the bandwidth required in the low pass averaging filter.

If the output of the first generator is passed through a noisy communication channel, the output of the correlator will be an impulse signal plus noise. The noise in a system is proportional to the bandwidth, so if the scan rate is reduced by a factor of 10 say, the output filter bandwidth can be reduced by the same factor and the signal to noise ratio improved by 20dB. A means is thus provided for trading off scan time against signal to noise ratio.

In wired television broadcasting systems, there is inevitably a transfer of signal from one channel (the disturbing channel) to another (the disturbed channel). This crossview has conventionally been measured by removing the "disturbed" signal while the level of the "disturbing" signal on the "disturbed" channel is measured. This has two disadvantages, in that the service to viewers of the "disturbed" channel is interrupted during measurement, and in that the dynamic condition of any repeaters in the system are altered resulting in possibly incorrect measurements.

It is an object of the present invention to make use of the above-described features of PRBPS to enable the measurement of crossview in wired television broadcasting systems in the presence of normal television programme signals.

According to the present invention there is provided a method for measuring crossview between channels in a wired television broadcasting system, wherein a PRBPS is applied to a first channel, and the signal on a second channel is correlated with an identical sequence to provide an output representative of the crossview between the first and second channels.

The frequency of the PRBPS may be such that if it is directly applied to the first channel an adequate amplitude signal in the band of interest results. Alternatively, the PRBPS may be modulated on a carrier, the signal on the second channel being demodulated to provide a PRBPS for correlation with said identical sequence.

A measure of the crossview ratio may be obtained by extracting the PRBPS from the first channel, correlating the extracted PRBPS with the identical sequence, and comparing the resultant output with the output representative of the crossview between the first and second channels.

To enable measurement of crossview in the presence of television program signals on the channels, the PRBPS may be applied to the first channel either at a level low enough to be imperceptible to a viewer of the television program signals, or at a higher level if the PRBPS signal is inserted during one or more of the unused scanning lines which occur during a vertical interval of the television programme signal.

The present invention also provides an apparatus for measuring crossview between channels in a wired television broadcasting system, comprising a PRBPS signal source, means for applying the output of the PRBPS source to a first channel, and means for correlating the signal on the second channel with an identical sequence to provide an output representative of the crossview between the first and second channels.

Embodiments of the present invention will now be described, by way of example, with reference to the accompanying drawings, in which:

FIGS. 4 and 5 respectively show a PRBPS generator and a correlator.

Figure 1:
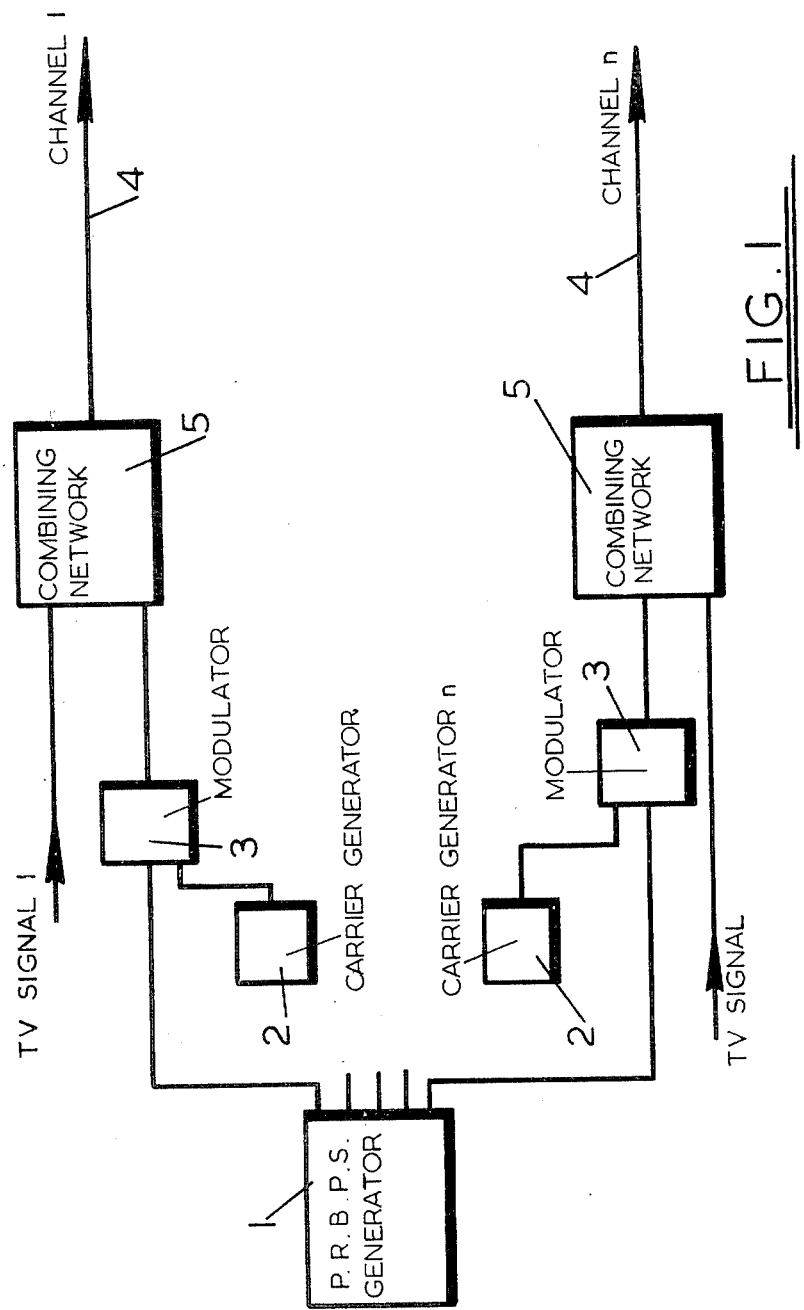
FIG. 1 illustrates one embodiment of head-end equipment which may be used in accordance with the present invention.

Referring to FIG. 1, a PRBPS generator 1 provides respective PRBPS outputs each having a different time delay with respect to a datum to each of n channels. Each channel comprises a carrier generator 2 and a modulator 3 to modulate the PRBPS on the generated carrier. The modulated carriers are combined with respective TV signals and applied to the inputs 4 allocated to each channel by a combining network 5. The modulated carriers are at a sufficiently low level to ensure that the effects are imperceptible to viewers.

Figure 2:
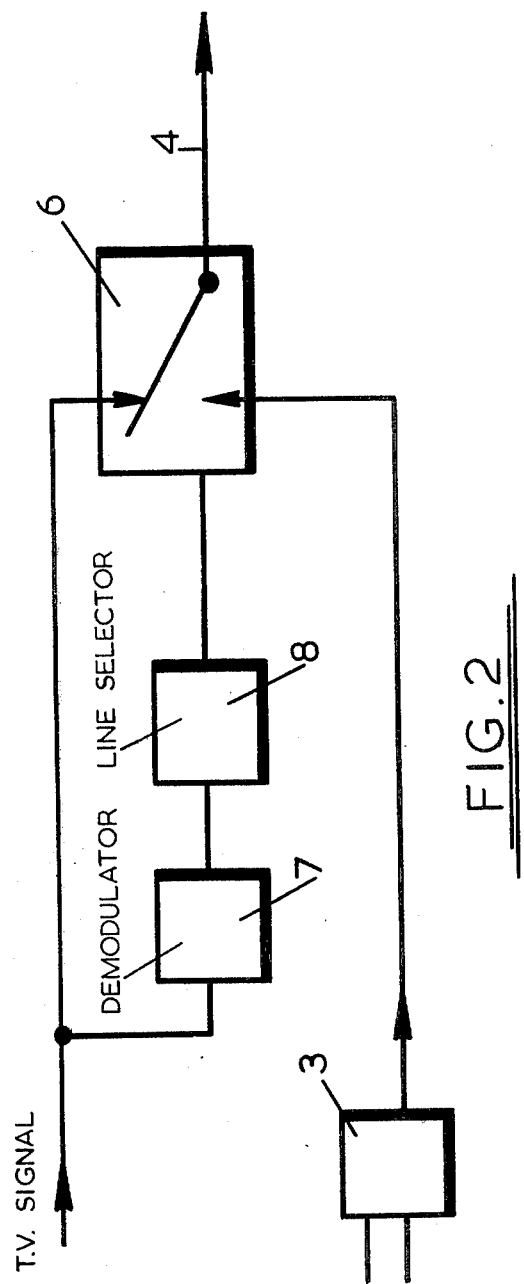
FIG. 2 illustrates a modification of the head-end equipment of FIG. 1.

In the alternative arrangement of FIG. 2, each combining network 5 is replaced by an electronic cross-over switch 6 controlled by a demodulator 7 and line selector 8 to apply the PRBPS modulated carrier to the input 4 during one or more of the unused scanning lines which occur during a vertical interval of the TV programme signal.

Figure 3:
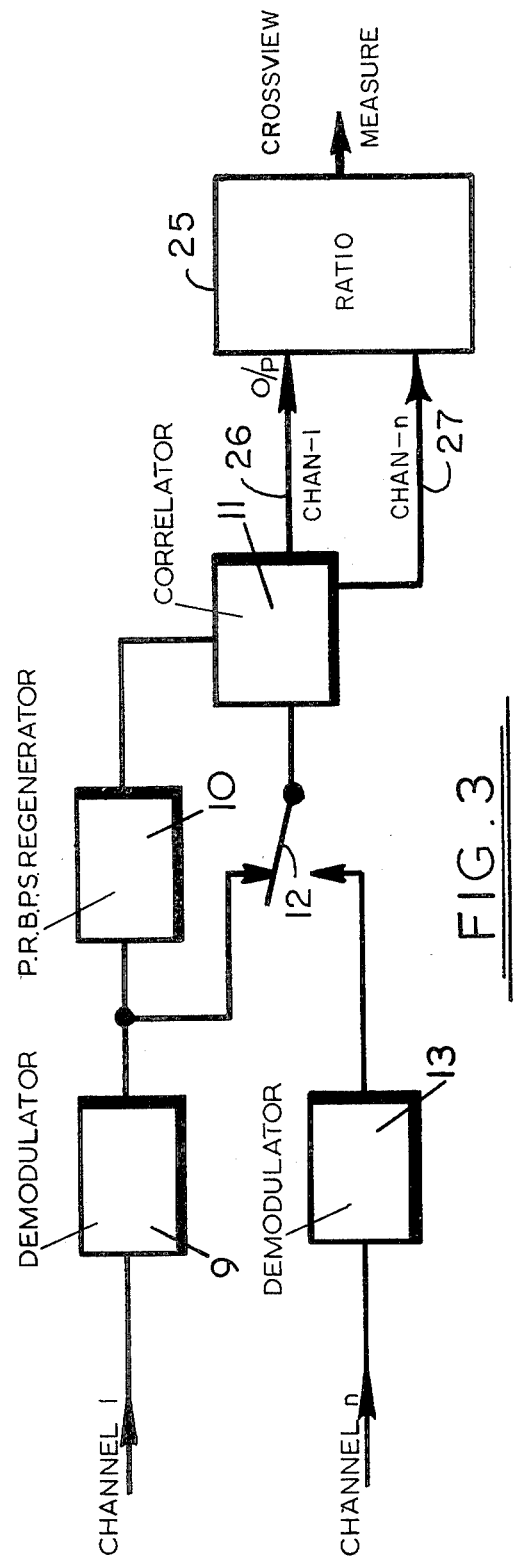
FIG. 3 shows equipment which may be used at the point of crossview measurement.

At the point of crossview measurement, the equipment of FIG. 3 is connected to channels 1 and n to measure the crossview ratio between channel 1 (the disturbing channel) and channel n (the disturbed channel). The signal on channel 1 is demodulated by demodulator 9, an identical sequence is generated by PRBPS regenerator 10, and the two signals are correlated by a correlator 11. This provides a first output. A switch 12 is then actuated to connect the correlator 11 to a demodulator 13 which receives signals from channel n the output of which is correlated with the output of PRBPS regenerator 10 to provide a second output. The ratio comparator 25 processes the first and second correlated outputs at lines 26, 27 to provide a measure of the crossview.

Television transmission networks are more usually tested with a $\sin^2$ pulse rather than an impulse. However, a $\sin^2$ pulse is itself commonly generated by passing an impulse through a special shaping filter. Thus if such a filter suitably scaled is placed in the output of the correlator 11, the familiar test pulse can be obtained. Two advantages are gained over the conventional method. Firstly the time scale is stretched so that the response can be examined with a simple cheap oscilloscope or plotted out using a Y-t pen recorder. Secondly, as described above, the PRBPS test signal can be added to a TV program at barely perceptible $-40$dB relative level and extracted with a signal to noise ratio of 40dB or greater, or alternatively the PRBPS test signal can be inserted at the normal television program signal level during one or more of the unused scanning lines which occur during a vertical interval of the program signal. Thus a means of testing distribution networks during program hours is available which does not require the monitoring of dim traces on expensive oscilloscopes.

Figure 4:
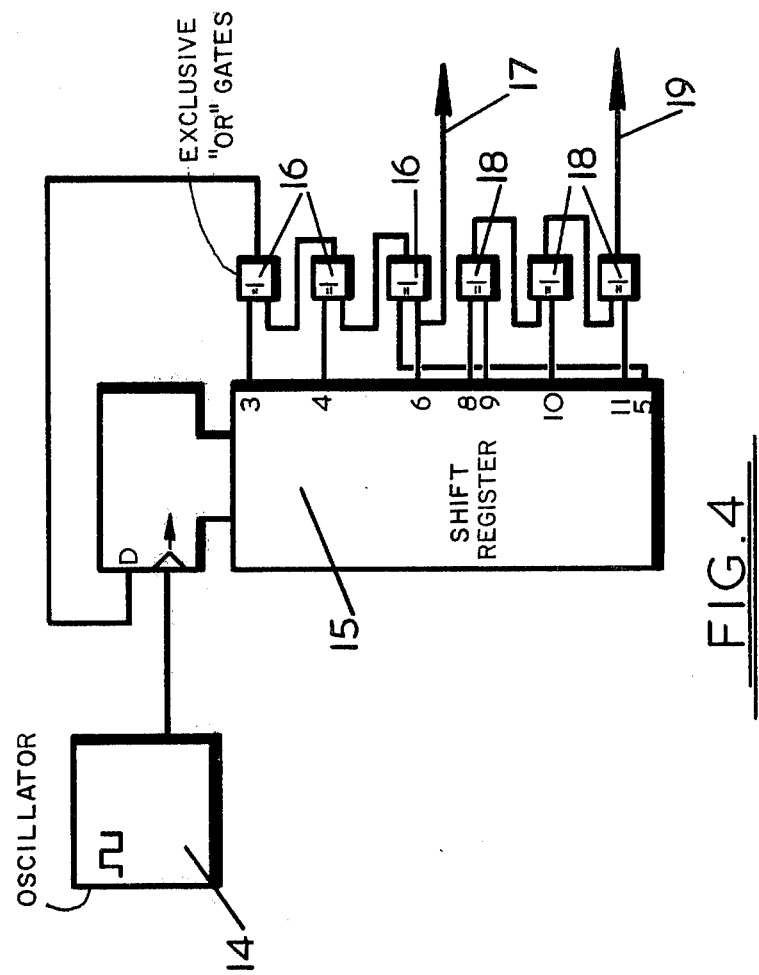

Referring to FIGS. 4 and 5, a shift register with appropriate feed back is used to generate a suitable PRBPS. By addition of the outputs of cells of the register two identical sequences are derived one of which is delayed in time with respect to the other. One sequence is added as previously described to the signal on each pair of an hf multipair TV wired broadcast system.

At the point of the system at which it is desired to measure the cross-talk loss, the same sequence is generated locally and first correlated with the disturbed pair to establish a reference level and phase. The crosstalk from each of the other pairs can then be measured by correlation with the sequence appropriately delayed.

If on the other hand it is required to measure the crosstalk from all the other pairs then the output of a number of correlators, one for each disturbing pair, is summed.

Referring particularly to FIG. 4, an oscillator 14 clocks a shift register 15 four cell outputs of which, typically 3 and 4, 5 and 6, are combined by exclusive or gates 16 and fed back to the data input terminal of the shift register 2 to generate a pseudo random binary pulse sequence output 17. Other cell outputs, typically 8 and 9, 10 and 11, are similarly combined by gates 18 to produce the same sequence at output 19 delayed relative to output 17. Further similar arrangements of cell outputs and gates (not shown) may be used to produce further sequence outputs each having a different relative display.

At the sending end, the outputs 17, 19 are added on to the signal on different conductor pairs.

At the point of measurement, the sequence generating equipment is duplicated and the outputs 17 and 19 are applied to correlators 20 (FIG. 5) together with the signal 21 from the pair to be measured.

The outputs of the correlators 20 are applied to a switching network 22 the output 23 of which may be arranged to be equal to any selected one output of the correlators 20 or the sum of the outputs of all but any selected one.

Although only two sequence outputs 17, 19 are described with reference to FIGS. 4 and 5, in practice as many sequence outputs are generated as there are channels (pairs of conductors) in the system at the point of measurement.

For example, if it is desired to measure crossview in a cable comprising six pairs of twisted together conductors each pair dedicated to a respective HF television signal, five time displaced but otherwise identical PRBPS signals are generated by a shift register and gates in a signal transmitter and applied to respective pairs of conductors. At the receiving end, crossview measurements may be made in one of two ways. Firstly, the crossview between each of the five pairs separately and the sixth pair can be measured using a single correlator which is slowly swept by the controlling clock generator. As a result five individual peaks occur in the correlator output corresponding to the generated signal coming into phase with each of the five received signals. Secondly, the aggregate effect of the crossview from all five pairs to the sixth can be measured by having circuitry in the receiver which is similar to that provided in the transmitter to make the five correlated output signal peaks occur simultaneously. The receiver timing generator is then swept at the appropriate rate and a single measurement results which corresponds to the aggregate crossview of all five disturbing signals appearing on the sixth conductor pair.

The normal base and PRBPS transmission is characterised by a frequency spectrum which is a maximum at DC and which progressively falls to a null at the clock frequency. It then rises to a lesser amplitude peak between the first and second harmonics of the clock frequency and gradually dies away. For many purposes this is of no real consequence, but if for example one is interested in the 4 to 10MHz frequency range it is convenient to have the maximum amplitude in that range. This can be done by applying a suitable secondary coding to alter the spectrum. For example, if bi-phase coding is used, that is a coding scheme in which each "0" of the intended PRBPS at baseband is complemented by an immediately following "1" and each "1" is complemented by an immediately following "0" on a bit for bit basis, that is if 001100 becomes 010110100101, the spectrum of the PRBPS signal at baseband is such as to give a null at DC and another null at the clock frequency with a maximum between the two.

What is claimed is:

1. A method for measuring crossview between channels having input sending and output receiving ends in a wired television broadcasting system, wherein two identical PRBPS signal sequences time displaced one with respect to the other are applied one to a first channel and the other to a second channel, the signals passed through the two channels are correlated in turn with a further identical sequence generated at the output end to provide separate correlated outputs at the output end having a ratio representative of the crossview protection ratio between the first and second channels and comparing the separate correlated outputs to provide a measure of the crossview ratio.

2. A method according to claim 1, wherein said two PRBPS signals are modulated on respective carriers and the modulated carriers are applied to said first and second channels.

3. A method according to claim 2, wherein the signals on said first and second channels are demodulated and the resultant PRBPS signals are correlated in turn with said identical sequences.

4. A method according to claim 1, 2 or 3, wherein a plurality of time displaced but otherwise identical PRBPS signals are applied to all but one of a corresponding plurality of channels between which crossview is to be measured, and an aggregate crossview measurement is made on the said one channel by applying the signal to a plurality of correlators each correlating with said PRBPS having a time displacement corresponding each to each with the time displacements of the applied signals, and by summing the outputs of said correlators.

5. A method according to claim 1, wherein the PRBPS signal is applied to the first channel together with television signals with the PRBPS signal at a level which is low enough to be imperceptible to viewers on television signals broadcast on the first channel.

6. A method according to claim 5, wherein the PRBPS signal is substituted for one or more of the unused scanning lines which occur during a vertical interval of the television program signal.

7. An apparatus for measuring crossview between channels in a wired television broadcasting system, comprising a PRBPS signal source, means for applying an output sequence of the PRBPS signal source to a first channel and to a second channel in delayed form, means for producing an identical PRBPS signal at the receiving end of the channels, means coupled to said receiving end of the channels for correlating the signal on the first and second channels with the identical sequence to provide outputs the ratio of which is representative of the crossview protection ratio between the first and second channels, a carrier generator coupled with each channel, a modulator coupled with each channel for modulating the output of a respective carrier generator with the output of the PRBPS signal source, a demodulator and line selector for receiving a TV signal and detecting unused scanning lines occurring during a vertical interval of the TV signal, and a crossover switch for selecting the output of the modulator under the control of the demodulator and line selector such that the output of the modulator is substituted for an unused scanning line or lines of the TV signal.

8. An apparatus according to claim 7, further comprising a combining network coupled with each channel for combining the output of the respective modulator with a TV signal and applying the combined signals to the respective channel.

9. Apparatus as defined in claim 7, wherein the PRBPS signal source comprises a shift register and an associated feedback circuit.

* * * * *